United States Patent
Krajnc

(10) Patent No.: US 10,555,399 B2
(45) Date of Patent: Feb. 4, 2020

(54) ILLUMINATION CONTROL

(71) Applicant: SIGNIFY HOLDING B.V., Eindhoven (NL)

(72) Inventor: Hugo José Krajnc, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/343,117

(22) PCT Filed: Oct. 10, 2017

(86) PCT No.: PCT/EP2017/075819
§ 371 (c)(1),
(2) Date: Apr. 18, 2019

(87) PCT Pub. No.: WO2018/073052
PCT Pub. Date: Apr. 26, 2018

(65) Prior Publication Data
US 2019/0261484 A1    Aug. 22, 2019

(30) Foreign Application Priority Data

Oct. 18, 2016 (EP) ..................... 16194323

(51) Int. Cl.
*H05B 37/02* (2006.01)
*G06F 16/583* (2019.01)
*G06T 5/50* (2006.01)

(52) U.S. Cl.
CPC ......... *H05B 37/02* (2013.01); *G06F 16/5838* (2019.01); *G06T 5/50* (2013.01); *G06T 2207/20221* (2013.01)

(58) Field of Classification Search
None
See application file for complete search history.

(56) References Cited

U.S. PATENT DOCUMENTS 6,542,180 B1    4/2003   Wasserman et al.
7,831,599 B2   11/2010   Das et al.
(Continued)

FOREIGN PATENT DOCUMENTS

KR    101232248 B1    2/2013
WO   2007069143 A2   6/2007
(Continued)

OTHER PUBLICATIONS

Tommaso Gritti et al., "Automatic Light Scene Setting Through Image-Based Sparse Light Effect Approximation," IEEE Transactions on Multimedia, vol. 14, No. 4, Aug. 2012 (8 Pages).

*Primary Examiner* — Jany Richardson
(74) *Attorney, Agent, or Firm* — Meenakshy Chakravorty

(57) ABSTRACT

A method for automatically creating lighting settings based on an image or images. An event associated with such images can be detected, such as the uploading of a number of photos to a gallery, or the posting of an image on social media. By assessing the event, and the image or images, it is possible to determine whether and how to create a new lighting scene. If multiple images are present, it may be possible to group or merge the images to downselect to one or a small number of images, or image parameters. The lighting scene or scenes can then be created based on these images or parameters. For example, a scene can be created to mimic the colour palette, or even to attempt to mimic or reflect shapes or distributions of light or colour in the image.

15 Claims, 5 Drawing Sheets

(56) References Cited

U.S. PATENT DOCUMENTS

| | | |
|---|---|---|
| 8,520,967 B2 | 8/2013 | Bilcu et al. |
| 2011/0022396 A1 | 1/2011 | Van De Sluis et al. |
| 2012/0057050 A1 | 3/2012 | Ashdown |
| 2013/0321448 A1* | 12/2013 | Gritti ................. H05B 37/0218 |
| | | 345/589 |
| 2014/0258297 A1 | 9/2014 | Davari |
| 2015/0172645 A1 | 6/2015 | Nobori |
| 2016/0262243 A1 | 9/2016 | Kishimoto et al. |
| 2018/0279446 A1* | 9/2018 | Van De Sluis .... H05B 33/0863 |
| 2019/0116647 A1* | 4/2019 | Deixler .............. H05B 37/0227 |
| 2019/0289697 A1* | 9/2019 | Meerbeek ............. G06F 16/587 |

FOREIGN PATENT DOCUMENTS

| | | |
|---|---|---|
| WO | 2008146245 A1 | 12/2008 |
| WO | 2011030267 A1 | 3/2011 |
| WO | 2015104953 A1 | 7/2015 |

\* cited by examiner

ILLUMINATION CONTROL

CROSS-REFERENCE TO PRIOR APPLICATIONS

This application is the U.S. National Phase application under 35 U.S.C. § 371 of International Application No. PCT/EP2017/075819, filed on Oct. 10, 2017, which claims the benefit of European Patent Application No. 16194323.8, filed on Oct. 18, 2016. These applications are hereby incorporated by reference herein.

TECHNICAL FIELD

The present disclosure relates to control of illumination in an illumination system.

BACKGROUND

"Connected lighting" refers to a system of luminaires which are controlled not by (or not only by) a traditional wired, electrical on-off or dimmer circuit, but rather via a wired or more often wireless network using a digital communication protocol. Typically, each of a plurality of luminaires, or even individual lamps within a luminaire, may each be equipped with a wireless receiver or transceiver for receiving lighting control commands from a lighting control device according to a wireless networking protocol such as ZigBee, Wi-Fi or Bluetooth (and optionally also for sending status reports to the lighting control device using the wireless networking protocol).

Luminaires may have individually controllable parameters, such as brightness and colour, and one or more luminaires may be controlled together in a group in a coordinated manner to create an overall light distribution, or scene, for illuminating an area or space such as room in a desired manner. Combinations of different luminaires and/or different settings of the luminaires can achieve a different overall illumination of the area of space, as desired. In this way, users can fine-tune their light preferences over a large spectrum of parameters, such as white tone, colour, and brightness, to customize their light experience to their needs and tastes. Dynamic effects can also be included.

Rather than having to control individual luminaires, or even individual settings for the or each luminaire, in order to achieve a desired illumination, it is usually preferable for groups of settings to be stored together corresponding to a desired light distribution, or "scene". For example a "morning" scene, or a "relaxing" scene can be created, which can then be recalled quickly and easily by a user with a single command. Such scenes can be created for particular activities, such as dining or reading for example, providing suitable illumination levels and conditions.

These scenes tend to be grouped into two main categories: scenes can be used to create a specific functional lighting type or they can be used to generate a desired ambiance. Functional lighting types of scenes typically relate to the different tones of white that can be applied, with the purpose of helping relax, concentrate, etc.

Ambiance-oriented scenes, on the other hand, tend to be a mixture of colours with no specific design pattern other than what the user desires to experience. Some systems allow only for manual setting of ambiance scenes (i.e. the user needs to configure each lamp taking part in the scene), while others allow for images to be used: the user selects a specific image and the most striking/predominant colours are extracted and deployed to the lamps. This hopes to create an atmosphere that closely resembles that of the image. For example, if a picture of someone at the beach is chosen, then the lights will typically adopt a combination of yellow, orange, and blue colours, resembling the sand and the ocean/sky.

SUMMARY

Being able to create a scene based on a picture or image allows a particular colour scheme or ambience to be produced relatively quickly and easily. However, such a feature may not be used as often as it could, as the required number of steps or level of user involvement is still too high for some users. For example, after returning from holiday, a user will probably have tens or more likely hundreds of pictures from various places that were visited. Selecting an appropriate image to be used as source for the scene might be too time-consuming or there might not be sufficient notion from the user on which the ideal picture should be.

In other cases, the user might like a specific image for what it brings to memory, but issues in the image like tourists in the background, temporary artefacts, etc. might mean that the colour palette extracted does not really match that which the user associates with that specific moment or activity.

It would be desirable to provide improved illumination control, and in particular, to provide improved creation of lighting scenes. A lighting scene can be stored in a lighting system, such as in a central memory, on a user interface device such as a mobile phone or in one or more lighting devices. Alternatively or additionally a lighting scene can be stored on other devices that are part of or can interface with the lighting system. A user can recall a stored lighting scene such that the lighting system will render the lighting scene.

Accordingly, in one aspect of the invention there is provided a method for automatically creating lighting settings based on an image or images, the method comprising detecting a trigger event associated with one or more source images; selecting, in response to said trigger event, one or more target images from said one or more source images, based on said detected event, and based on one or more image parameters of the source images; determining lighting settings based on said colour parameters of said selected target image or images; and outputting said determined lighting settings.

In this way, lighting settings can be created automatically based on images, pro-actively engaging the user to use a connected lighting system by linking it to events and activities which occur outside of the lighting system (e.g. posting on social media). The method can advantageously select the most relevant images, and the most appropriate images for creating a scene, with minimal user input. A stored lighting scene, based on said target images, can then be recalled independently of said images. For example, the images need not remain in the virtual image gallery as the lighting scene remains accessible even when the images are no longer accessible (e.g. have been moved or deleted).

In embodiments, selecting comprises grouping images based on common image parameters. In this way, multiple images can be separated into two or more groups, so that each group shares common features or characteristics. Known clustering or segmentation algorithms can be used for example. Typically images are grouped according to features which will affect lighting settings, such as colour, saturation or brightness. Selecting may further comprise ranking images within a group. Ranking may be based on parameters relating to the trigger event such as number of views, or number of comments (to be explained in greater detail below), or alternatively may be based on image parameters such as colour parameters.

As part of the method, merging of two or more selected images may be performed to obtain merged image parameters. For example the colour palette of multiple images can be combined. Averaging may be performed on numerical parameters relating to images for example.

Therefore it will be understood that the method enables downselection of multiple images to one or a small number (e.g. 2 or 3). In an example, 50 images may be related to a trigger event, such as a user uploading images from a memory stick to a virtual gallery. The method may be able to divide these into two groups based on colour or image feature characteristics, which might correspond to images captured at different locations, or different times of day or lighting conditions for example. From the first group a single image may be selected as having a colour palette considered the most appropriate for a scene for a given room, while the second group may be merged to provide an "averaged" colour palette.

In embodiments, detecting a trigger event comprises detecting changes to the number of images stored in an image store, and may further comprise detecting a number of images stored per unit time. For example the number of images being loaded into a particular image gallery can be monitored, and compared to a threshold, or to common user patterns. For example an pre-determined threshold may be set (e.g. 50 images in a day) or an average number of images stored per day or hour can be determined, and a trigger event may be related to this average (e.g. number of images per day exceeds 120% of average). Larger than average increases may typically indicate an event that a user deems significant, and may wish to attempt to recreate via a lighting scene.

Detecting a trigger event may comprise detecting a local user's activity in relation to an image or images in certain embodiments, for example the total number of times a user has viewed an image, or the number of times an image is viewed per week for example. Alternatively the way a local user has viewed or used an image may be detected, for example a user setting an image as a screensaver on his or her phone or tablet for example.

In addition to monitoring the local user's behaviour in relation to an image or images, or as an alternative, detecting a trigger event may comprise monitoring and/or detecting network activity related to an image or images in embodiments: for example, detecting the number of interactions of remote networked users with said image or images. Such interactions are typically via social media and/or image sharing applications such as Facebook, Whatsapp, Instagram, Snapchat etc. and examples of user inputs or interactions include indicating approval, forwarding, sharing or commenting.

In embodiments, outputting said determined lighting settings comprises proposing and/or previewing said settings to a user. This may be via a simple notification indicating that a new scene has been created, and may optionally include information concerning what has triggered that scene and, for example, a view of the related image or images. The output may prompt the user to accept or discard the scene, and may optionally allow the user to preview the scene (in the case that the user is physically present where the scene is to be implemented). Possibly subject to approval from a user, outputting may comprise storing the scene in a lighting system, or in a memory to which the lighting system has access.

Aspects of the invention also provide a lighting system for implementing lighting control methods as described above. The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention extends to methods, apparatus and/or use substantially as herein described with reference to the accompanying drawings. Any feature in one aspect of the invention may be applied to other aspects of the invention, in any appropriate combination. In particular, features of method aspects may be applied to apparatus aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which.

DETAILED DESCRIPTION OF EMBODIMENTS

Figure 1:
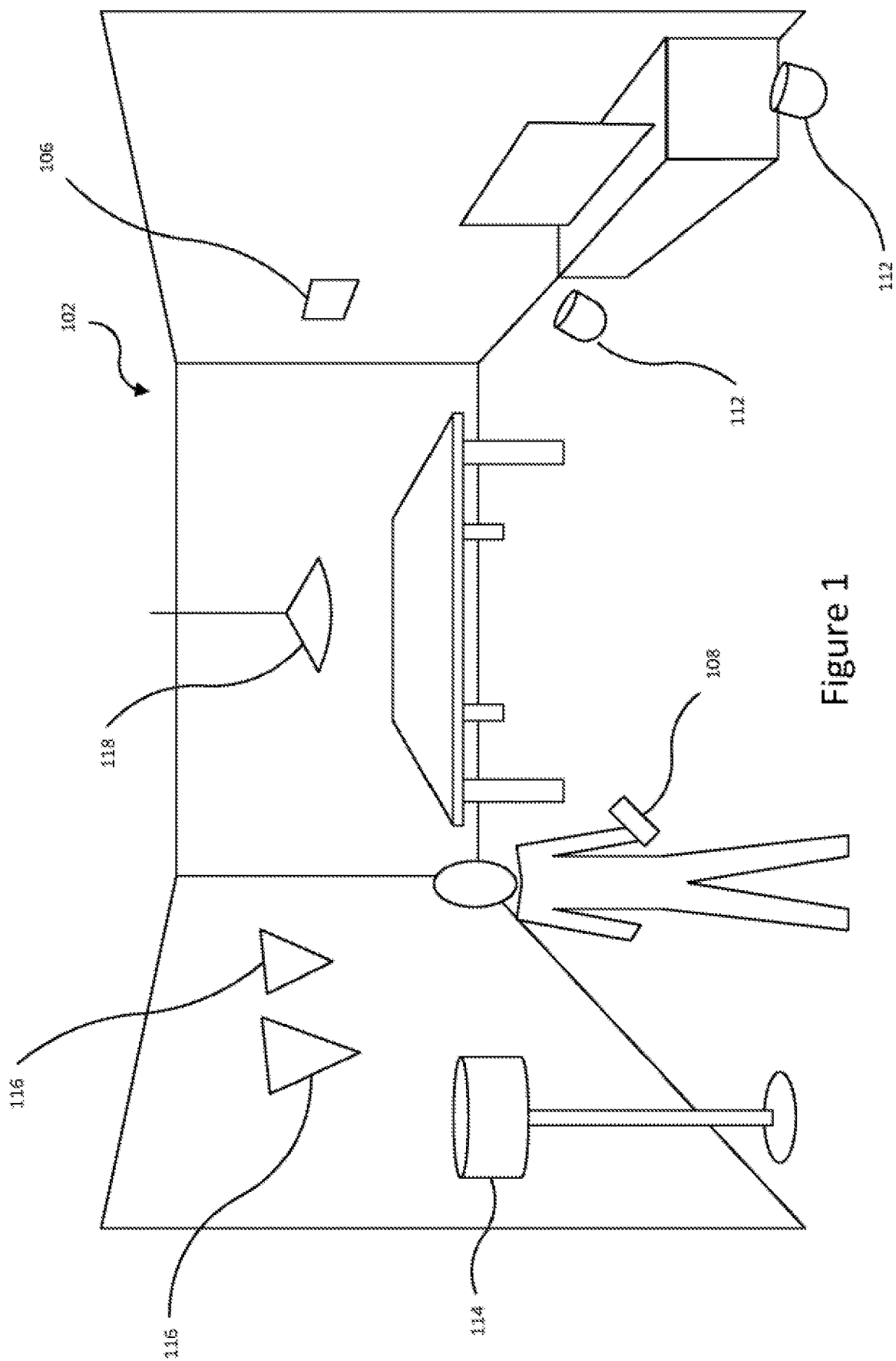
FIG. 1 shows an example of a room including a plurality of lighting units.

FIG. 1 shows a lighting system installed or otherwise disposed in an environment 102, e.g. an indoor space such as a room, or any other space or environment that can be occupied by one or more people such as the interior of a vehicle. The lighting system comprises one or typically a plurality of luminaires, each comprising one or more lamps or illumination emitting elements and any associated housing, socket(s) and/or support. LEDs may be used as illumination emitting elements, but other alternatives such as incandescent lamps e.g. halogen lamps are possible. A luminaire is a lighting device for emitting illumination on a scale suitable for illuminating an environment 102 occupiable by a user. In this example, luminaries include a floor standing lamp 114, wall mounted uplighters 116, a ceiling pendant 118, and two floor mounted wall washers 112. Other examples include a spotlight or uplighter or downlighter. A system may include multiple instances of a luminaire type, and multiple different luminaire types. Luminaires can be portable (i.e. their location can be changed easily, and can even continue to run for a limited period of time without connection to mains due to internal energy storage units).

A user can control the lighting system via a user terminal such as a wall panel 106. Alternatively or additionally a mobile user terminal 108 may be provided in order to allow the user to control the lighting system. This may be in the form of a smartphone or tablet for example, running an application or "app", or may be a dedicated remote control. The user terminal or terminals comprise a user interface such as a touchscreen or a point-and-click interface arranged to enable a user (e.g. a user present in the environment 102, or located remotely in the case of a mobile terminal) to provide user inputs to the lighting control application.

Figure 2:
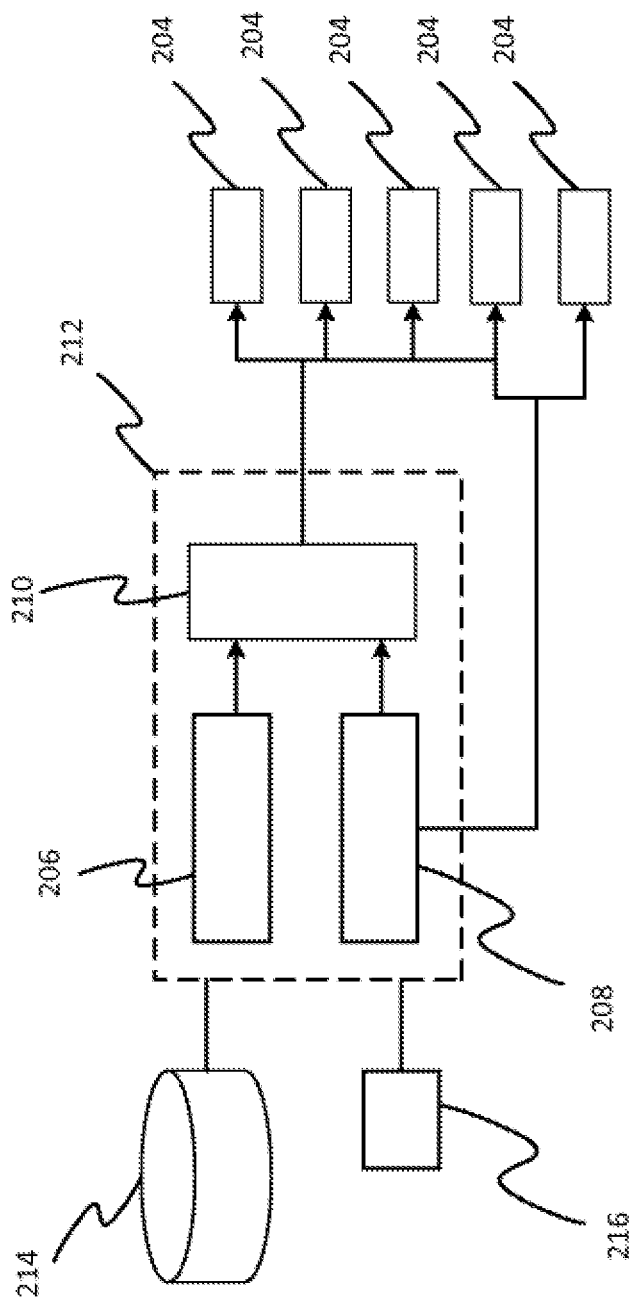
FIG. 2 illustrates a lighting system schematically.

Referring to FIG. 2, an example of a lighting system is shown schematically. A user terminal 206, connects to luminaires 204 via an intermediate device 210 such as a wireless router, access point or lighting bridge. User terminal 206 could for example be the wall panel 106 of FIG. 1, and the intermediate device could be integrated in the wall panel or provided as a separate device. User terminal 208 is a mobile user terminal, such as terminal 108 of FIG. 1, and may also connect to the luminaires via the device 210, but may additionally or alternatively connect to the luminaires directly without an intermediate device. User terminal 208 may also be spatially fixed, but share the properties of a mobile user terminal in that it can connect directly to a luminaire, such as in the case of a stand-alone wall switch. Connection between the devices may be wired, using a protocol such as DMX or Ethernet, or wireless using a networking protocol such as ZigBee, Wi-Fi or Bluetooth for example. Luminaires may be accessible only via device 210, only directly from a user terminal, or both.

For instance the user terminal 206 may connect to the intermediate device 210 via a first wireless access technology such as Wi-Fi, while the device 201 may connect onwards to the luminaires 4 via a second wireless access technology such as ZigBee. In this case intermediate device 210 converts the lighting control commands from one protocol to another.

Device 210 and user terminals 206 and 208 comprise a functional group illustrated schematically by dashed line and labelled 212. While three separate elements are shown in this functional group in this example, it will be understood that different numbers of elements are possible. For example a single user terminal in the form of a smartphone and a single intermediate device in the form of a router can be envisioned. In some examples, a single device such as a smartphone or tablet may be able to provide all the functions of group 212.

The functional group 212 may further be connected to a storage device or server 214, which may be part of a network such as the internet for example, enabling information to be imported to or exported from the lighting system. In examples the lighting system may interface with a dedicated server or cloud service provided for the system, however the system may also interface with third party software or services, such as social media and/or image storage applications. A user terminal may employ a web browser to access content from network or server 214.

Each element of the group 212 may include a memory, or have access to a storage function, which may be provided by storage device or server 214. Luminaires 204, or at least some of the luminaires 204, may also include a memory.

This arrangement allows input of user commands at the user interface of a user terminal 206 or 208, and transmission of corresponding control signals to appropriate luminaires for changing illumination (e.g. recalling a particular scene). This arrangement also allows obtaining, storing, evaluating, proposing, selecting and distributing of illumination settings. These functions are preferably provided by one, or a combination of elements in the functional group shown schematically in dashed line and labelled 212, however some functionality may be distributed to the storage device or server 214.

As noted above, it has been proposed to use an image to allow a user to create a lighting scene for a lighting system, such as the systems illustrated in FIGS. 1 and 2.

An image can be input to the system, for example from a smartphone acting as a user terminal or from a network such as the internet, and the image can be analysed, and settings for the various luminaires determined based on the results of the image analysis. In more basic examples, the overall colour distribution or content of the image can be determined, for example in a colour histogram, and the luminaires controlled to provide a corresponding distribution in a room or space. More sophisticated techniques allow the spatial distribution of colours in an image to be taken into account. For example a blue sky which is generally located in the upper portion of an image is reflected in the lighting system by controlling luminaires to provide a blue hue to an upper part of a room. This will therefore take into account the type and position of luminaires in a room, and where the output illumination is directed—wall mounted uplighters may be used to provide illumination for an upper part of a room for example.

Even more sophisticated systems may use more complex analysis of an image, to determine shapes or features in the image, and attempt to replicate such shapes, or use features to control the illumination, based on the arrangement of luminaires available. For example from an image of a sunset, a circular orange shape corresponding to the sun may be extracted and matched to a pendant luminaire, which can then be controlled to provide an output having a matched shade of orange. In an alternative example, an image of an illuminated canal at night may have a strong linear blue feature which can be recognized, and matched to a linear LED string or lightstrip, which is controlled to emulate that feature.

Figure 3:
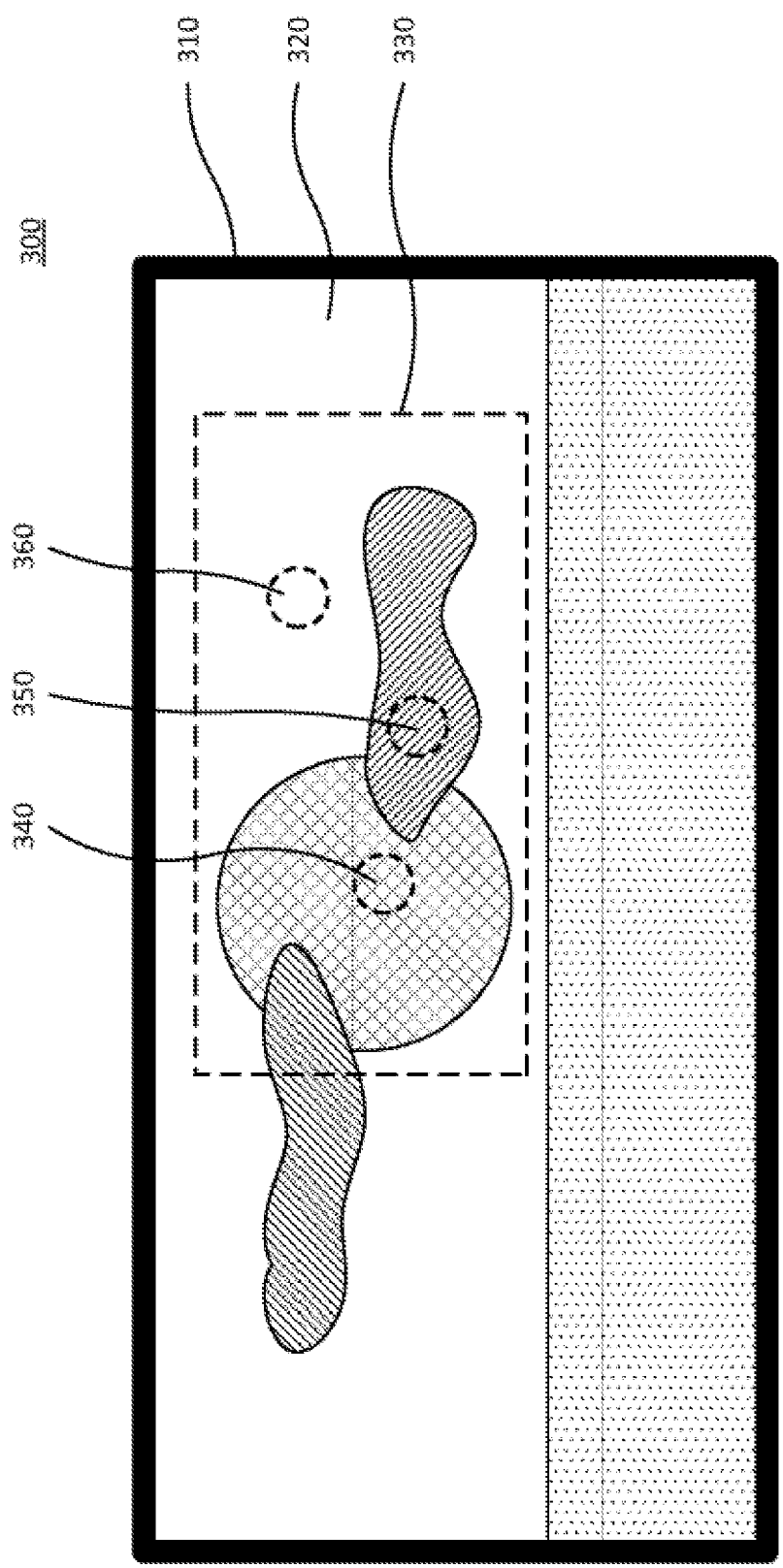
FIG. 3 illustrates an example image on which a lighting scene can be based.

FIG. 3 is provided to illustrate one possible example of using an image to control a light output. As noted above however, there are a number of possible ways of using an image to control a light output, and depending on the precise technique used, the same image may give rise to different light outputs. FIG. 3 shows an image 300 comprising a border section 310 and a main section 320. The image shows a night scene with a moon, partially hidden behind clouds, and positioned above the horizon of a pasture. A first area of the image 330, based on which a brightness level is to be determined, is marked by a dotted line (the dotted line not being a part of the image, in this example). There are three sub-sections 340, 350, 360 of the image from which one or more colours are extracted to generate the set of colours. All three subsections 340, 350, 360 fall within the first area 330. The first subsection 340 comprises part of the moon in the image 300, the second subsection 350 comprises part of a cloud, and the third subsection 360 comprises part of the sky. In this example, the colours picked are orange (moon; subsection 340), red (cloud, subsection 350) and blue (sky, subsection 360). According to an example method, the brightness level of the first area is determined and the intensity of the light emitted by the one or more lighting devices is based on this determined brightness level. Thus, the colours selected (yellow, red, blue) are rendered in the light scene at an appropriate light intensity.

These colours can, as an example, be selected automatically or manually. The order in which the selected colours are rendered by a lighting device, for example in a dynamic light scene, or presented in a user interface can be determined such that there is minimal perceptual difference between subsequent colours. This produces a visually pleasant palette or gradient.

When there are multiple lighting devices, colours can be assigned to individual lighting devices or each lighting device can render the same colour(s). When lighting devices render different colours, the following is an example to illustrate how colours can be assigned to lighting devices. A first colour for the first lighting device is picked (e.g. randomly or based on the ordered colours). The picked colour can then be excluded from the colour set and for the next lighting device a new colour can be picked from the colour set. This process can be repeated until all lighting devices (or light source in a luminaire) have a colour assigned. Alternatively, instead of randomly picking colours for the additional light sources, the adjacent colours of the colour palette can be picked. This could have the advantage of creating a smooth colour gradient in a space or on a luminaire with multiple light sources. Examples of other rules that can be applied to assign a colour to a lighting device include choosing a complementary colour, choosing an opposite colour, etc.

Figure 4:
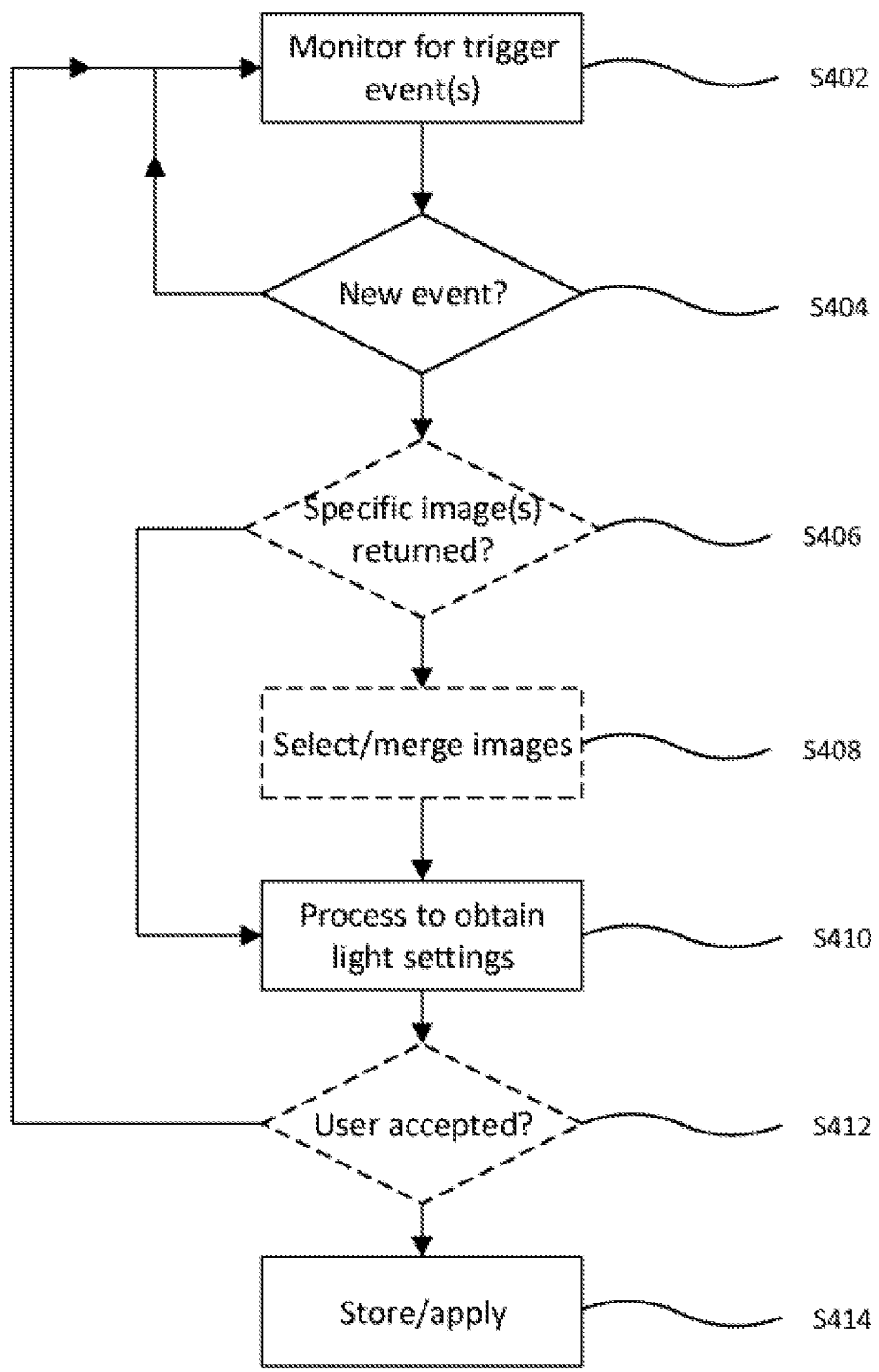
FIG. 4 is a flow chart illustrating a lighting scene creation process.

FIG. 4 illustrates a process by which new scenes can be generated based on an image or images.

In step S402, the system monitors for a trigger event or events, which start the process of scene generation. A trigger event is typically an event relating to an image or images, and preferably occurs when image related activity indicates that an image or group of images are of particular interest or relevance. The level of interest or relevance can be determined by a quantifiable metric in examples, and by assessing that metric against a threshold value.

For example, a first type of event relates to images captured by a user, using a camera or a smartphone for example, and stored in a particular location such as a gallery. The gallery may be on a local device, or may be a cloud storage service. The monitoring step S402 can detect images being stored in the gallery, and monitor the number of images stored and the frequency for example. A trigger event in this case may be a certain number of images being added in a certain time period. A larger than average number of photos being added in a shorter than average time may signify a noteworthy event such as a wedding or a concert attended by a user, and can provide a trigger for scene creation.

A further type of event relates to images received or viewed by a user which originate from a network, such as via an instant messaging service or an image sharing platform. Activity related to an image or image, both by the user of the lighting system, and by others, can be monitored to determine images of particular interest. The monitoring step S402 may monitor the number of views, likes, comments or shares of an image for example, relating to a particular image or images to trigger scene creation.

In step S404 it is determined whether a new event has occurred, as outlined above. If no event has occurred, the process return to monitoring at 5402, otherwise the process proceeds to step S406.

An optional step S406 determines whether the event identified at 5404 relates to a specific image or images. If it is determined that only a single image is identified for example, or if multiple specific images are identified, each image to be the basis of a scene, then it is determined that no group/merge processing is required, and the flow advances to step S410. If however it is determined that the trigger event relates to a group or groups of images, then the flow proceeds to step S408.

Where multiple images are identified as being of increased relevance or interest, these can be processed in step S408 to select one or a subset of images for further processing. Alternatively or additionally processing can be performed to group and/or merge images to allow a lighting scene to be created more readily. In the case of selection, data from the event may be relevant for ranking images for example, or alternatively visual aspects of the images can be assessed (e.g. colour palettes or brightness levels or saturation can be assessed to determine which might make the most viable lighting scheme).

In terms of grouping, a group can be defined as images which share common features. This may be features of shapes as determined by edges or characteristic features such as faces, or may be colour features, such as a similar colour palette. For example if multiple images are returned from the trigger detection, it may be possible to classify these into groups having similar features or colour schemes. A first group of pictures of seaside landscapes might be identifiable as having prominent horizons, and blue skies, and distinguishable from a second group of indoor portraits and group shots.

If a group of images can be identified as having common features or characteristics, then those images, or at least the common features of those images can be merged or averaged. In one example, the average colour palette of the identified group of images is determined.

Step S410 uses the resulting image or images or, in the case of merged images, image characteristics, to determine a lighting scene or scenes for a lighting system. This may be performed substantially as described above, to provide a colour palette for a scene, or potentially to determine more specific settings in relation to the spatial characteristics of an image or images.

At optional step S412, the determined scene or scenes can be proposed to a user, and a prompt provided for the user to confirm whether such a scene is accepted. This might simply be an alert that a scene has been created, together with an indication of the image or images on which it is based. This could be a notification on a user terminal, either as part of the lighting control interface or app, or as email or other notification. The system may additionally allow the user to preview the scene, and possibly also to adjust or fine tune it, before accepting or rejecting it. If the scene is rejected, the process returns to monitoring at S402, otherwise the process proceeds to step S414.

Alternatively, the optional step S412 may provide an indication to a user, without requesting or requiring a response or user input, merely to notify that a new scene has been created. In this case the flow proceeds to step S414.

Finally at step S414, the scene or scenes determined in step S410 are stored in the lighting system, and may also be applied if desired. The flow may then return to monitoring at S402 for a new iteration.

Figure 5:
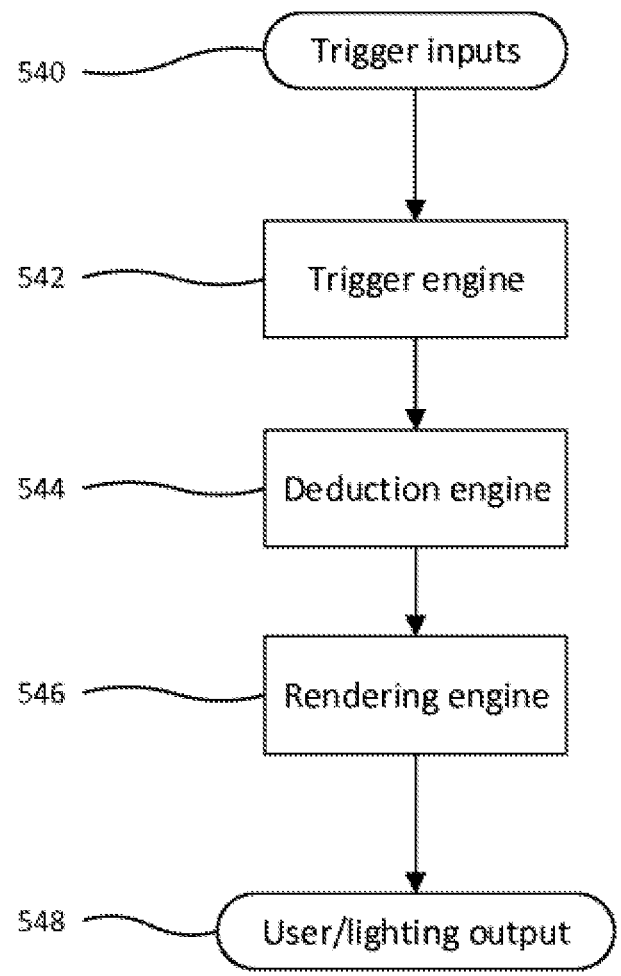
FIG. 5 is a schematic showing functional blocks capable of carrying out the process of FIG. 4.

FIG. 5 is a block diagram of functional components capable of performing the process of FIG. 4. The functional components of FIG. 5 may be realised by functional group 212 of FIG. 2 for example.

A trigger engine 542 monitors and receives inputs 540 from either or both of a local media store or a networked media store. The trigger engine is able to detect media such as images added to a store, and to gather metadata and activity information associated with the media, such as date of recordal, number of views/edits, sending and forwarding of the media etc. Based on the media and associated information, the trigger engine is able to determine media related events of interest, and to gauge whether or not a new lighting scene should be created linked to such events.

The trigger engine, on determining a new lighting scene should be created, invokes the deduction engine 544. The deduction engine determines, based on the trigger event, appropriate images or image parameters on which to base a lighting scene or scenes. In the case of a trigger event related to a single image, this is straightforward, however if multiple image are related to the event, the deduction engine may select one or a subset of images on which a scene is to be based, and may optionally merge or group images to extract parameters of those merged or grouped images on which the scene should be based.

The output from the deduction engine 544 is provided to the rendering engine 546, which creates a lighting scene based on such output. This may be performed in a number of ways, examples of which are provided above. The rendering engine can then output (548) the scene or information relating to the scene, for example to a user for confirmation of acceptance, and ultimately the lighting parameters comprising the scene can be stored and recalled by the luminaires of a lighting system when required.

The following non-limiting examples are provided to illustrate various possible features and scenarios:

In a first example a user has been away on holiday to the beach and taken a plurality of pictures of different areas of the beach, and stored the images on a smartphone. When the user first operates the lighting system after having returned, a trigger engine evaluates a list of parameters to determine whether a new scene should be suggested. In this case the trigger engine operates locally, and as such detects that the user's picture gallery in the smartphone has increased considerably in a certain period of time. The number of photos may for example exceed an average number per day used as a threshold. Additionally, it can also detect that these pictures have been geo-tagged with the user's location while taking the picture, further determining that these are pictures taken by the user and not received by an external service.

As a result, the trigger engine determines that the user has had a significant level of media activity lately, and as such the user might be interested in having a new scene based on such media activity. Therefore, the trigger engine concludes that a new scene should be created and recommended to the user.

A deduction engine is used to determine, based on the type of event, which should be the parameters to take into account for creating a scene. As all content is local to the phone and there is no connection to external services, therefore the deduction engine concludes that the best approach would be to take all pictures as sources for light settings and combine or average them. This result is then passed along to a rendering engine.

The rendering engine will, based on the conclusions of the deduction engine, average the colour and brightness content of all the pictures that were taken, make a histogram, etc., such that the most popular/frequent colours from the entire holiday picture set are identified. These colours and brightness levels will then be used as the colour palette for the scene. By averaging them the system also ensures that the impact of e.g. tourists on the background or clouds passing by do not take a relevant role in the final palette.

Since the stream of actions finished correctly, the system will inform the user (via an app on the smartphone in this example) that a new type of event has been detected and ask whether he would like to have a new scene created based on the associated media. If the user confirms, the app will create a new scene based on the selected colour palette and allow the user to select an appropriate name for it.

A second example concerns a similar scenario to that of the first example, however in this case the user spent some time at the beach but also decided to spend some time in the mountains. As a result, two different sets of images were taken, one linked to the beach and the sea and another one linked to mountains and the sky.

Upon returning, the trigger engine again concludes that a new event has taken place and as such a new scene should be suggested. As a result, the deduction engine is activated but in this case it determines that there are two distinct sets of images. Therefore, it recommends to the rendering engine that images in each set are combined/averaged as long as there are no large differences in colour between them. This will lead to the beach pictures be grouped separately from the mountain pictures.

Based on this input, the rendering image selects two colour palettes (e.g. yellow and blue for the beach, green and white for the mountain). Since the deduction engine concluded that two type of images were used, the system suggests two different scenes to the user.

In a third example, the trigger engine detects that a new image received by the user via an external service (e.g. Whatsapp, Gmail, etc.) has been viewed several times by the user over the last few days. The trigger may relate to the number of views per day in relation to a threshold, or alternatively a ranking could determine the most viewed image over a day or a week for example. As a result, the trigger engine determines that that image might be sufficiently relevant/interesting enough for the user to be used for a potential new lighting scene.

The trigger engine therefore activates the deduction engine based on that new image. Given that it is only a single image, the deduction engine concludes that this image should be the only source of information used and provides this information to the rendering engine.

The rendering engine performs colour palette extraction and then triggers the system to make the suggestion to the user. In this case, the system will tell the user that it has detected that a certain image in the phone has been seen frequently by the user and as such the user might want to turn it into a scene to keep reliving the moment.

As a variation of the above scenario, in a fourth example the trigger engine can also detect that an image is a good source for a new scene if it detects that the same image is being shared or forwarded frequently. For example, an image taken by the user (which would not in itself trigger a new scene for example by the mechanism of example 1) gets forwarded to several different chat groups, sent by email, posted on Facebook and Instagram, etc.

The trigger engine measures a level of activity associated with that image based on such actions, and as a result, the trigger engine determines that it is sufficiently relevant and should be used for a potential new scene. The process can then continue as per the third example.

In a fifth example the user uploads pictures of a party with friends to social media (e.g. Facebook or Instagram). The trigger engine is in this case also able to interface with these external services. After a period of time, the trigger engine notices that the pictures uploaded have received lots of positive feedback such as upvotes, likes, shares, comments, etc. The trigger engine can derive a measure of this positive feedback, and determines that the event is sufficiently relevant for a new scene to be created based on these pictures, and a scene can be created and suggested based on this.

The deduction engine then evaluates the situation. Given that the event links to popularity of images on social media, it determines that only the pictures with a specific amount of views, likes, upvotes, etc. should be used, as those are the ones that triggered the most reactions on the users; those with a lower count might not be that relevant. By selecting appropriate thresholds for this (e.g. only the pictures that have more than 20 upvotes, or only the pictures which are in the top 10% of the ranking, etc.) an appropriate subset of images are selected. These are then passed on to the rendering engine which selects the appropriate colour palettes and generates corresponding scenes. The system then informs the user that a new scene can be created based on his/her recent social media popularity.

In a sixth example, the trigger engine, while interfacing with these external services, can also detect events based on notifications received by the user. For example, it can detect when the user gets tagged in someone else's pictures, mentioned in someone's comment, or a specific message from the user gets forwarded/retweeted. If such an event is detected, the trigger engine informs the deduction engine that those sources should be investigated. The deduction engine can then determine whether there is specific media content attached to or associated with it. If there are images involved, the deduction engine can determine that they should be used for colour extraction, optionally evaluating the popularity of the event as mentioned in the fifth example above.

Additionally, the references to the user might be linked to other type of media, such as videos or songs. If this is the case, the deduction engine may choose to search online for other types of associated or related media where colours can be more easily extracted. For example, if the comments relate to a specific song, the engine can conclude that the source of light settings should be the cover image of the album the song belongs to; if the reference was a movie, the engine may use the most popular advertisement posters for that movie in the user's country of residence. These sources are then forwarded to the rendering image to follow the same steps as before.

As a further example feature, the trigger engine could be used to prompt the user based on detected use of the lighting system. For example, it can detect that scenes are used regularly but no new scenes have been created in a certain time period (e.g. 1 month or 6 months) in a specific room even though the system is installed with luminaires or light sources that can create lots of colour combinations. The deduction engine can then search online for most popular colours used in that type of room (e.g. study) and suggest to the user a new scene based on that new palette.

Upon detecting that the user hasn't created new scenes in a certain period of time, the trigger engine might also suggest the user to simply take a new picture of the room and use that as an input. That is, the trigger engine pro-actively requests that of the user such that there is new content for the user to experience.

As additional features, common to all of the examples above, the system might also look for specific key words in or related to an image or other media which has been identified as the basis for a scene. For example a picture is posted on Instagram and several people mention the word "bedroom" in this context. Based on these words, a lighting scene proposed to a user can be enriched additionally proposing a particular room for a scene.

It will be understood that the present invention has been described above purely by way of example, and modification of detail can be made within the scope of the invention. Each feature disclosed in the description, and (where appropriate) the claims and drawings may be provided independently or in any appropriate combination.

The various illustrative logical blocks, functional blocks, modules and circuits described in connection with the present disclosure, such as functional group 212, and engines 542, 544, 546, may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the function or functions described herein, optionally in combination with instructions stored in a memory or storage medium. A described processor may also be implemented as a combination of computing devices, e.g., a combination of a DSP and a microprocessor, or a plurality of microprocessors for example. Conversely, separately described functional blocks or modules may be integrated into a single processor. The steps of a method or algorithm described in connection with the present disclosure, such as the steps of FIG. 3, may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, and a CD-ROM.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for automatically creating one or more lighting scenes, for a lighting system comprising a plurality of luminaires for illuminating an environment, based on images, the method comprising:
 detecting a trigger event associated with source images captured by a user and stored in a virtual image gallery;
 selecting, in response to said trigger event, one or more target images from said source images, based on said detected trigger event and based on one or more image parameters of the source images;
 determining one or more lighting scenes for the lighting system based on said image parameters of said selected one or more target images; and
 outputting said determined one or more lighting scenes.

2. A method according to claim 1, wherein selecting comprises grouping the source images based on common image parameters.

3. A method according to claim 1, wherein selecting comprises ranking the source images within a group for the purpose of creating a lighting scene.

4. A method according to claim 1, further comprising merging two or more selected target images to obtain merged image parameters.

5. A method according to claim 1, wherein detecting a trigger event comprises detecting changes to the number of source images stored in an image store.

6. A method according to claim 5, wherein detecting a trigger event comprises detecting the number of source images being stored in the image store per unit time passes a threshold.

7. A method according to claim 1, wherein detecting a trigger event comprises detecting an activity performed by a user in relation to one or more of the source images.

8. A method according to claim 7, wherein detecting a trigger event comprises detecting the number of times a user views one or more of the source images.

9. A method according to claim 1, wherein detecting a trigger event comprises detecting network activity related to one or more of the source images.

10. A method according to claim 9, wherein detecting a trigger event comprises detecting the number of interactions of remote networked users with one or more of the source images.

11. A method according to claim 10, wherein said interactions comprise at least one of: indicating approval, forwarding, sharing and commenting.

12. A method according to claim 1, wherein outputting said determined one or more lighting scenes comprises proposing and/or previewing said scenes to a user.

13. A method according to claim 1, wherein outputting said determined one or more lighting scenes comprises storing said scenes in the lighting system.

14. A method according to claim 1, wherein said image parameters are colour parameters.

15. A computer program comprising instructions which, when executed on a computer, cause that computer to perform the method of claim 1.

* * * * *